(12) United States Patent
Veenstra

(10) Patent No.: US 7,651,331 B2
(45) Date of Patent: Jan. 26, 2010

(54) MULTI-TUBE HEAT TRANSFER SYSTEM FOR THE COMBUSTION OF A FUEL AND HEATING OF A PROCESS FLUID AND THE USE THEREOF

(75) Inventor: Peter Veenstra, Amsterdam (NL)

(73) Assignee: Shell Oil Company, Houston, TX (US)

( * ) Notice: Subject to any disclaimer, the term of this patent is extended or adjusted under 35 U.S.C. 154(b) by 754 days.

(21) Appl. No.: 11/371,888

(22) Filed: Mar. 9, 2006

(65) Prior Publication Data

US 2006/0210936 A1  Sep. 21, 2006

Related U.S. Application Data

(60) Provisional application No. 60/660,447, filed on Mar. 10, 2005.

(51) Int. Cl.
*F23C 5/08* (2006.01)
*F24J 1/00* (2006.01)

(52) U.S. Cl. .............. 431/181; 126/263.01; 126/263.02; 126/91 A; 431/177; 431/187; 431/354

(58) Field of Classification Search ................ 48/127.9; 95/51; 126/91 A, 263.01, 263.02; 166/57, 166/59, 65.1, 66, 250, 251.1, 256, 257, 302; 422/46, 49, 197, 198, 200, 204, 215, 652; 431/6, 11, 181, 207, 243
See application file for complete search history.

(56) References Cited

U.S. PATENT DOCUMENTS

| 2,772,737 | A | * | 12/1956 | Bond et al. ................. 166/283 |
| 2,819,761 | A | * | 1/1958 | Popham et al. ............. 166/257 |
| 2,902,270 | A | * | 9/1959 | Salomonsson et al. ...... 166/302 |
| 3,113,623 | A | * | 12/1963 | Krueger ....................... 166/59 |
| 3,519,396 | A | * | 7/1970 | Handman et al. ............ 422/310 |
| 3,527,052 | A | * | 9/1970 | Bryce ........................... 60/732 |
| RE26,990 | E |   | 11/1970 | Bongiorno ................... 252/373 |
| 3,810,732 | A |   | 5/1974 | Koch ............................. 431/7 |
| 4,029,146 | A |   | 6/1977 | Hart et al. .................... 165/166 |

(Continued)

FOREIGN PATENT DOCUMENTS

CN      87103900      12/1988

(Continued)

OTHER PUBLICATIONS

Khimicheskaya Entsiklopediya, M. Great Russian Encyclopedia, 508, with English translation.

*Primary Examiner*—Steven B McAllister
*Assistant Examiner*—Daniel E Namay

(57) ABSTRACT

A four-tube heating system for combusting a fuel and transferring the heat released therefrom to a process fluid. The heating system includes, a fuel introduction zone, a combustion zone, an oxidant introduction zone, and a process fluid zone, wherein the fuel introduction zone is defined by fuel introduction means for introducing fuel into the combustion zone that is defined by a reaction tube external to and surrounding the fuel introduction means, and wherein the oxidant introduction zone is defined by an oxidant introduction tube external to and surrounding the reaction tube, and wherein the process fluid zone is defined by a process tube external to and surrounding the oxidant tube.

7 Claims, 2 Drawing Sheets

U.S. PATENT DOCUMENTS

| | | | | |
|---|---|---|---|---|
| 4,104,018 | A | 8/1978 | McKay | 432/29 |
| 4,273,188 | A | 6/1981 | Vogel et al. | 166/256 |
| 4,400,179 | A * | 8/1983 | Marion et al. | 48/86 R |
| 4,692,306 | A * | 9/1987 | Minet et al. | 422/49 |
| 4,818,371 | A | 4/1989 | Bain et al. | 208/106 |
| 4,909,808 | A * | 3/1990 | Voecks | 48/94 |
| 5,008,085 | A | 4/1991 | Bain et al. | 422/109 |
| 5,154,599 | A | 10/1992 | Wunning | 431/215 |
| 5,181,990 | A | 1/1993 | Arisaki et al. | 196/110 |
| 5,255,742 | A * | 10/1993 | Mikus | 166/303 |
| 5,306,481 | A | 4/1994 | Mansour et al. | 423/652 |
| 5,321,191 | A | 6/1994 | Alagy et al. | 585/648 |
| 5,330,970 | A | 7/1994 | Reid et al. | 507/90 |
| 5,424,095 | A | 6/1995 | Clark et al. | 427/237 |
| 5,426,655 | A | 6/1995 | Feig | 371/49.3 |
| 5,427,655 | A | 6/1995 | Woebcke et al. | 196/138 |
| 5,433,271 | A | 7/1995 | Vinegar et al. | 166/272 |
| 5,446,229 | A | 8/1995 | Taylor et al. | 585/648 |
| 5,463,159 | A | 10/1995 | Callejas et al. | 585/648 |
| 5,523,502 | A | 6/1996 | Rubin | 585/324 |
| 5,536,488 | A | 7/1996 | Mansour et al. | 423/652 |
| 5,554,347 | A | 9/1996 | Busson et al. | 422/204 |
| 5,559,510 | A | 9/1996 | Strong, III et al. | 340/954 |
| 5,567,305 | A | 10/1996 | Jo | 208/48 R |
| 5,600,051 | A | 2/1997 | Baker et al. | 585/648 |
| 6,153,152 | A | 11/2000 | Ruhl et al. | 422/197 |
| 6,296,686 | B1 | 10/2001 | Prasad et al. | 95/51 |
| 6,749,021 | B2 | 6/2004 | Vinegar et al. | 166/245 |
| 6,796,789 | B1 | 9/2004 | Gibson et al. | 431/2 |
| 6,877,554 | B2 | 4/2005 | Stegemeier et al. | 166/245 |
| 7,025,940 | B2 * | 4/2006 | Shah et al. | 422/198 |
| 7,063,145 | B2 | 6/2006 | Veenstra et al. | 166/250.01 |
| 7,121,342 | B2 | 10/2006 | Vinegar et al. | 166/302 |
| 2002/0015670 | A1 * | 2/2002 | Shah et al. | 422/198 |
| 2002/0027001 | A1 * | 3/2002 | Wellington et al. | 166/59 |
| 2003/0101650 | A1 * | 6/2003 | Okada et al. | 48/62 R |
| 2003/0101651 | A1 * | 6/2003 | Weedon | 48/197 R |
| 2003/0182858 | A1 * | 10/2003 | Shah et al. | 48/127.9 |
| 2004/0022724 | A1 | 2/2004 | Robb | 423/651 |
| 2004/0033455 | A1 | 2/2004 | Tonkovich et al. | 431/7 |
| 2004/0057898 | A1 * | 3/2004 | Singh et al. | 423/652 |
| 2004/0185398 | A1 | 9/2004 | Butler | 431/2 |
| 2004/0265224 | A1 * | 12/2004 | Papavassiliou et al. | 423/651 |
| 2005/0178064 | A1 * | 8/2005 | Maruko | 48/198.7 |
| 2005/0223643 | A1 | 10/2005 | Butler | 48/94 |
| 2006/0000395 | A1 * | 1/2006 | Joshi et al. | 110/267 |
| 2006/0021280 | A1 * | 2/2006 | Hamilton et al. | 48/127.9 |
| 2006/0199119 | A1 * | 9/2006 | Abbasi et al. | 431/8 |
| 2006/0199127 | A1 | 9/2006 | Butler | 431/215 |
| 2006/0210468 | A1 | 9/2006 | Veenstra | 423/456 |
| 2006/0210936 | A1 | 9/2006 | Veenstra | 431/11 |
| 2006/0222578 | A1 | 10/2006 | Veenstra et al. | 422/198 |
| 2006/0248800 | A1 | 11/2006 | Miglin et al. | 48/198.7 |
| 2007/0151152 | A1 * | 7/2007 | Mukai et al. | 48/127.9 |
| 2007/0175094 | A1 * | 8/2007 | Reinke et al. | 48/127.9 |
| 2007/0254251 | A1 * | 11/2007 | Cao et al. | 431/10 |
| 2008/0244973 | A1 * | 10/2008 | Higashino | 48/127.9 |

FOREIGN PATENT DOCUMENTS

| | | |
|---|---|---|
| EP | 450872 | 10/1991 |
| EP | 0962422 | 6/1999 |
| EP | 0962422 | 12/1999 |
| JP | 271834 | 3/1990 |
| WO | WO2004022480 | 3/2004 |
| WO | WO2004059208 | 7/2004 |
| WO | WO2005090230 | 9/2005 |

* cited by examiner

MULTI-TUBE HEAT TRANSFER SYSTEM FOR THE COMBUSTION OF A FUEL AND HEATING OF A PROCESS FLUID AND THE USE THEREOF

This application claims the benefit of U.S. Provisional Application No. 60/660,447, filed Mar. 10, 2005 which is hereby incorporated by reference.

The invention relates to a heat transfer system for the combustion of a fuel and for the heating of a process fluid. In another aspect, the invention relates to the use of a heat transfer system for the flameless combustion of a fuel to directly heat a process fluid that is to be used in a process.

U.S. Pat. No. 4,692,306 discloses a concentric tube catalytic reaction apparatus that includes an annular reaction chamber that surrounds a convection chamber which surrounds a burner chamber. Within the burner chamber is a burner assembly providing a radiating heat source for releasing heat for transfer to the reaction chamber.

EP 0 450 872 B1 discloses several types of reaction apparatuses one of which includes a combustion tube that surrounds a fuel tube having perforations at spaced intervals along its length. Fuel is fed via the fuel tube and its perforations into the annulus between the fuel tube and the combustion tube wherein it mixes with air and ignites to release heat that is used to heat the catalyst bed that surrounds the combustion tube.

U.S. Pat. No. 5,255,742 discloses a method of heating a subterranean formation using a flameless combustion apparatus. The apparatus includes a fuel gas conduit containing a plurality of orifices. The fuel gas conduit is centralized within a combustion air conduit to form a first annulus between the fuel gas conduit and the combustion air conduit. The orifices provide for fluid communication between the fuel gas conduit and the first annulus. The combustion air conduit is centralized within a wellbore casing to thereby form a second annulus between the combustion air conduit and the wellbore casing. Fuel gas is introduced into the first annulus via the orifices of the fuel gas conduit to mix with the air and to combust within the first annulus. The first annulus formed by the combustion air conduit is in fluid communication with the second annulus between the combustion air conduit and the wellbore casing. This fluid communication provides a flow path for the combustion gases to be introduced into the second annulus and to travel up the second annulus to the surface to thereby provide heat that is transferred to a subterranean formation.

U.S. Publication No. 2003/0182858 describes a method for providing controlled heat to a process fluid by utilizing a flameless distributed combustion device. The device includes a fuel conduit containing a plurality of fuel nozzles distributed along its length and a surrounding oxidation chamber. A conduit that surrounds the fuel conduit forms the oxidation chamber. The device further includes a process chamber that surrounds the oxidation chamber. The fuel nozzles provide communication from within the fuel conduit to the oxidation chamber wherein the oxidant and fuel are mixed and the fuel combusted. The heat released from the combustion is transferred to the process chamber.

An object of the invention is to provide for the combustion of a fuel and the direct transfer of heat that is released therefrom to a process fluid.

Accordingly, a process system is provided comprising, in concentric relationship, a fuel introduction zone, a combustion zone, an oxidant introduction zone, and a process fluid zone, wherein said fuel introduction zone is defined by fuel introduction means for introducing fuel into said combustion zone that is defined by a reaction tube external to and surrounding said fuel introduction means, and wherein said oxidant introduction zone is defined by an oxidant tube external to and surrounding said reaction tube, and wherein said process fluid zone is defined by a process tube external to and surrounding said oxidant tube.

Another embodiment of the invention includes a process system comprising a fuel tube having a fuel tube length and a fuel tube wall that define a fuel introduction zone, wherein said fuel tube includes a distal end and a fuel inlet end for introducing a fuel into said fuel introduction zone, and wherein along said fuel tube length and through said tube wall is a plurality of spaced apart apertures; a reaction tube having a reaction tube length and that is positioned external to and surrounding said fuel tube so as to thereby define a combustion zone along said fuel tube length, wherein said reaction tube has a reaction tube inlet end for receiving a preheated oxidant into said combustion zone and an exhaust end for discharging a combustion exhaust from said combustion zone, and wherein said plurality of spaced apart apertures provide for fluid communication between said fuel introduction zone and said combustion zone; an oxidant introduction tube having an oxidant introduction tube length and that is positioned external to and surrounding said reaction tube so as to thereby define an oxidant introduction zone along said reaction tube length, wherein said oxidant introduction tube has an oxidant introduction tube inlet end for introducing an oxidant into said oxidant introduction zone and an oxidant introduction tube outlet end for discharging said preheated oxidant from said oxidant introduction zone into said combustion zone through said oxidant introduction tube outlet end which is in fluid communication with said reaction tube inlet end, and wherein said oxidant introduction zone is in heat exchange relationship with said combustion zone; and a process tube that is positioned external to and surrounding said oxidant introduction tube so as to thereby define a process fluid zone along said oxidant introduction tube, wherein said process tube has a process fluid inlet end for introducing a process fluid into said process fluid zone and a process fluid outlet end for discharging a heated process fluid from said process fluid zone, and wherein said process fluid zone is in heat exchange relationship with said combustion zone.

A further embodiment of the present invention includes a method comprising introducing a fuel into a fuel tube having a fuel tube length and a fuel tube wall that define a fuel introduction zone, wherein said fuel tube includes a distal end and a fuel inlet end for introducing said fuel into said fuel introduction zone, and wherein along said length and through said tube wall is a plurality of spaced apart apertures; introducing a preheated oxidant into a reaction tube having a reaction tube length and that is positioned external to and surrounding said fuel tube so as to thereby define a combustion zone along said fuel tube length, wherein said reaction tube has a reaction tube inlet end for receiving said preheated oxidant into said combustion zone and an exhaust end for discharging a combustion exhaust from said combustion zone, and wherein said plurality of spaced apart apertures provide for fluid communication between said fuel introduction zone and said combustion zone; introducing an oxidant into an oxidant introduction tube having an oxidant introduction tube length and that is positioned external to and surrounding said reaction tube so as to thereby define an oxidant introduction zone along said reaction tube length, wherein said oxidant introduction tube has an oxidant introduction tube inlet end for introducing said oxidant into said oxidant introduction zone and an oxidant introduction tube outlet end for discharging said preheated oxidant from said oxidant introduction zone into said combustion zone through said oxidant introduction tube outlet end which is in fluid communication with said reaction tube inlet end, and wherein said oxidant introduction zone is in heat exchange relationship with said combustion zone; introducing a process fluid into a process tube that is positioned external to and surrounding said oxidant introduction tube so as to thereby define a process fluid zone along said oxidant introduction tube, wherein said process tube has a process fluid inlet end for introducing said process fluid into said process fluid zone and a process fluid outlet end for discharging a heated process fluid from said process fluid zone, and wherein said process fluid zone is in heat exchange relationship with said combustion zone; discharging said heated process fluid from said process fluid zone; and discharging said combustion exhaust from said combustion zone.

Figure 1:
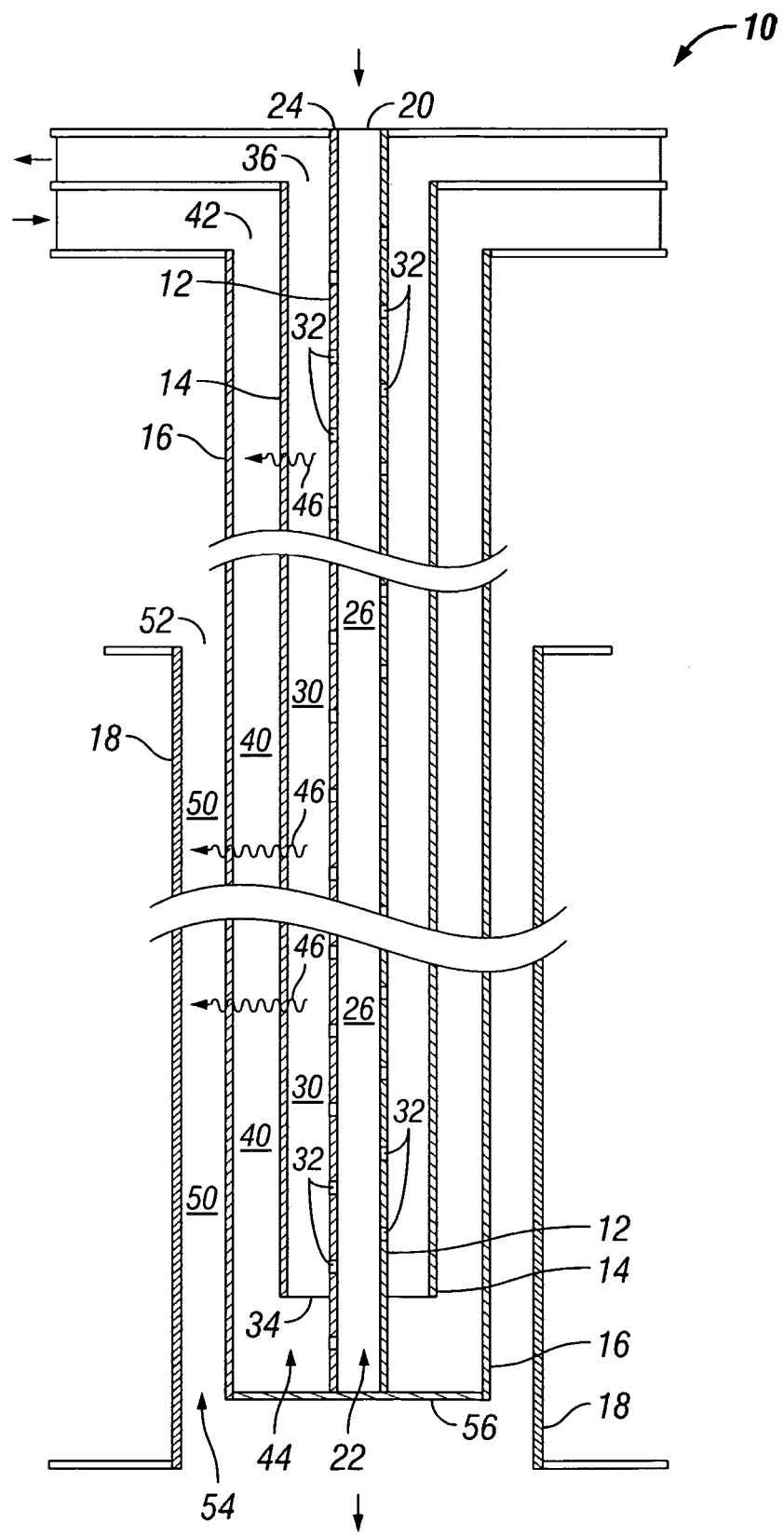
FIG. 1 is a sectional view of elements of the heat transfer system for the combustion of a fuel and for the heating of a process fluid.

The invention provides a heat transfer system or device that may be used in the direct transfer of heat energy released by the combustion of a fuel, preferably by flameless combustion, to a process fluid. The heat transfer system has many possible uses and applications, but, in particular, the use of a direct heating system such as the one described in detail in this specification may be especially beneficial in endothermic dehydrogenation processes such as processes for the dehydrogenation of ethylbenzene to yield a styrene product. For instance, the direct heating system of the invention may provide for the controlled rate of fuel introduction through a fuel tube to a combustion zone in a manner so as to provide for a uniform combustion of the fuel along the fuel tube. This uniform combustion may provide for a uniform temperature profile along the fuel tube. This combustion may provide for a controlled temperature profile through the combustion zone. Some benefits that may be realized include, but are not limited to, reducing steam usage, operating at higher throughputs, increasing yields and selectivity, decreasing coke make, and increasing the pressure of the operation.

The direct heating system may also provide for so-called flameless combustion of a fuel with released heat to be transferred to a process fluid. Because there is no flame associated with the flameless combustion of the fuel, the oxidation reaction (i.e., the flameless combustion) occurs at a relatively low temperature as compared to the flame temperatures observed in conventional combustion and heat transfer devices such as those that occur in conventional fired heaters. While the temperature of the flameless oxidation of a fuel may vary depending upon the fuel that is combusted, it may typically be in the range of from about 600° C. to about 1100° C., or from about 750° C. to about 1050° C. as opposed to the flame temperatures observed in the conventional burning of fuels that may typically exceed 1650° C.

The direct heating system of the invention may also provide for heat transfer to a process stream that is to be heated in a manner so as to provide a heat transfer efficiency that exceeds that of conventional heating systems. One of the features of the invention is that it provides for the direct heating of a process stream in that the process fluid is in close relationship with the outer surface of a reaction tube within which fuel combustion occurs. The process stream is contained by a process sleeve or conduit or tube that surrounds an oxidant introduction tube which surrounds the reaction tube to thereby provide a process fluid zone. The process fluid zone may be a process annulus formed by the process tube surrounding the oxidant introduction tube. Heat transfer to the process fluid is maximized by providing for both convection and radiant heat transfer with the process sleeve providing for a second heat radiating surface to that of the reaction tube surface or the oxidant introduction tube surface.

Now referring to FIG. 1, presented is a sectional view of elements of the heat transfer system 10. The heat transfer system 10 is a four-tube system including a fuel or fuel introduction tube 12, a reaction tube 14, which is external to and surrounds fuel tube 12, an oxidant or oxidant introduction tube 16, which is external to and surrounds reaction tube 14, and process tube 18, which is external to and surrounds oxidant tube 16. The tubes of the four-tube system may have any suitable geometry that provides for a conduit. In typical embodiments, the tubes of the heat transfer system 10 may be made from any suitable commercially available pipe stock or square or rectangular tube stock. For example, the tubes may be standard pipe, according to the ANSI/ASME B36.10M standard, the European DIN 2448 standard, or any other standard. Non-limiting examples of such suitable standard pipe include: ¾ inch schedule 40 pipe as defined by the ANSI/ASME B36.10M standard (DN 20 as defined by the DIN 2448 standard), which may be used for the fuel tube 12, 3.5 inch schedule 40 pipe, as defined by the ANSI/ASME B36.10M standard (DN 90 as defined by the DIN 2448 standard), which may be used as the reaction tube 14, and 5 inch schedule 40 pipe as defined by the ANSI/ASME B36.10M standard (DN 125 as defined by the DIN 2448 standard), which may be used as the oxidant tube 16. The process tube 18 may be a pipe that serves as a process sleeve that surrounds the oxidant tube 16, or a shell (not shown) may be used that encompasses an assembly or bundle of a plurality of a three-tube combination of the fuel tube 12, reaction tube 14 and oxidant tube 16.

While the previously listed standard pipes are presented as examples, any suitable pipe may be used for the tubes of the heat transfer system 10, including schedule 80 and higher or lower schedules of pipe. The sizes of the pipes that may suitably be used may range from 13 mm (½ inch) to 300 mm (12 inch), and in the case of a tube bundle, the process shell may have a diameter upwardly to 305 cm (10 feet), 460 cm (15 feet) or 610 cm (20 feet) or greater.

The fuel tube 12 has a fuel tube length extending from its fuel inlet end 20 to its distal end 22, and fuel tube 12 further has fuel tube wall 24. Together, the fuel tube wall 24 and the fuel tube length define a fuel introduction zone 26, which extends through at least a portion of the fuel tube length of the fuel tube 12. The fuel tube 12 further provides means for introducing a fuel into a combustion zone 30. The fuel is introduced into the fuel introduction zone 26 through the fuel inlet end 20, which provides means for introducing the fuel into the fuel introduction zone 26. The combustion zone 30 is a conduit, formed between the fuel tube 12 and the reaction tube 14, that is defined by the reaction tube 14 being positioned external to and surrounding the fuel tube 12. The fuel tube 12 may further include a plurality of apertures 32 that are defined by the fuel tube wall 24.

The apertures 32 are spaced apart axially along a portion of the length of the fuel tube 12 and provide for fluid communication between the fuel introduction zone 26 and the combustion zone 30. When the heat transfer system 10 is in use, the apertures 32 function by providing a conduit for the fuel from within the fuel introduction zone 26 to be introduced into a preheated oxidant that is passing through the combustion zone 30.

The spacing, orientation and size of the apertures are such that as to provide for the introduction of increments of fuel from fuel introduction zone 26 into the combustion zone 30 in amounts and at such rates as to provide for rapid and complete mixing of the preheated oxidant and the fuel. Due to the rapid and complete mixing, the oxidation reaction between the preheated oxidant and fuel is not limited by the rate of mixing. Thus, generally, it is the combination of the fuel introduction zone 26 geometry, as defined by the fuel tube 12, and the combustion zone 30 geometry, as defined by the reaction tube 14, that provide for the fuel velocity and preheated oxidant velocity that results in the desired rapid and complete mixing of the two fluids. The fuel tube introduction zone 26 geometry includes such features as the fuel tube length, the fuel tube diameter, and the number, spacing, orientation and size of the apertures of the fuel tube 12. The combustion zone 30 geometry includes such features as its reaction tube diameter and length.

As noted above, the apertures 32 are spaced apart in the axial direction along the length of the fuel tube 12, and the apertures 32 may be positioned in their respective radial planes at different orientations along the length of the fuel tube 12. For example, the position of the apertures 32 may alternate 180 degrees in the radial planes along the length of the fuel tube 12, or they may alternate 120 degrees, or 90 degrees and so forth. Therefore the position of the apertures in the fuel tube 12 may be such that their orientation in the radial planes alternate along the length of the fuel tube 12 with their orientations varying from 0 degrees to 360 degrees or from 30 degrees to 180 degrees. It is preferred, however, for the aperture orientations to alternate at from about 60 to 120 degrees along the length of the fuel tube 12.

The reaction tube 14 has a reaction tube length and, as described above, is positioned external to and surrounds the fuel tube 12 so as to thereby define the combustion zone 30 that extends along the length of fuel tube 12. The reaction tube length of reaction tube 14 extends from reaction tube inlet end 34 to exhaust end 36. The oxidant tube 16 has an oxidant tube length and is positioned external to and surrounds reaction tube 14 in a manner so as to define an oxidant introduction zone 40 along the length of the reaction tube 14. The oxidant introduction zone 40 is a conduit, formed between the reaction tube 14 and the oxidant tube 16, defined by the oxidant tube 16 being positioned, as earlier noted, external to and surrounding the reaction tube 14. The oxidant tube length extends from oxidant introduction tube inlet end 42 to oxidant introduction tube outlet end 44.

It is a feature of the heat transfer system 10 for the oxidant introduction zone 40 to be configured so that it provides for the heat exchange relationship between the oxidant introduction zone 40 and the combustion zone 30. In the operation of the heat transfer system 10, an oxidant is introduced into the oxidant introduction zone 40 through the oxidant introduction tube inlet end 42, which provides means for introducing the oxidant into the oxidant introduction zone 40. The oxidant passes through oxidant introduction zone 40 and absorbs heat energy by the transfer of heat from the combustion zone 30 to thereby provide a preheated oxidant. The curvy arrows 46 depict the transfer of heat energy from the combustion zone 30 into the oxidant that passes through the oxidant introduction zone 40. The preheated oxidant is discharged from the oxidant introduction zone 40 through oxidant introduction tube outlet end 44 and is introduced into combustion zone 30 through the reaction tube inlet end 34. Oxidant introduction tube outlet end 44 provides means for discharging the preheated oxidant from oxidant introduction zone 40 into combustion zone 30 through oxidant introduction tube outlet end 44, which is in fluid communication with reaction tube inlet end 34. The reaction tube inlet end 34 provides means for receiving the preheated oxidant into the combustion zone 30. By preheating the oxidant and/or fuel in the heat transfer system 10, the capital expenditure can be reduced. Supplementary heat exchangers that may be needed to recover heat from one or more of the streams or to provide heat to one or more of the streams outside of the heat transfer system 10 may be designed differently, including the use of lower cost materials, or may not be necessary.

The increments of fuel that are introduced into the combustion zone 30 through apertures 32 and the preheated oxidant are intimately mixed within the combustion zone 30 to form a combustion mixture. Further, within the combustion zone 30 the combustion of the combustion mixture occurs whereby heat is released. The flameless combustion of fuel is achieved within combustion zone 30 in part by the mixing of the preheated oxidant to form the combustion mixture having a combustion mixture temperature that exceeds the auto-ignition temperature of the combustion mixture. Thus, the heat transfer system 10 is configured so that the heat exchange relationship between the combustion zone 30 and oxidant introduction zone 40 provides for the preheated oxidant having a preheated oxidant temperature that is sufficiently high to provide for the aforementioned combustion mixture temperature that exceeds the auto-ignition temperature of the combustion mixture.

Typically a fuel is selected for use in the operation of the heat transfer system 10, wherein the auto-ignition temperature of the combustion mixture comprising the fuel is in the range of from 400° C. (752° F.) to 1500° C. (2732° F.), or from 500° C. (932° F.) to 1400° C. (2552° F.), but more typically, from 600° C. (1112° F.) to 1350° C. (2462° F.) and, most typically, from 700° C. (1292° F.) to 1300° C. (2372° F.).

The temperatures at which the oxidant and fuel are introduced into the heat transfer system 10 may be in a broad range of temperatures including temperatures that approach ambient temperatures. The oxidant and fuel may also be heated to above ambient temperature prior to their introduction into the heat transfer system. Thus, the temperature of the oxidant to be introduced into the heat transfer system 10 through oxidant introduction tube inlet end 42 may be in the range of from about −30° C. (−22° F.) to about 2000° C. (3632° F.), or from about −10° C. (14° F.) to about 1200° C. (2192° F.) or from about −10° C. (14° F.) to about 400° C. (752° F.). The temperature of the oxidant introduced into the heat transfer system may be at a temperature of at least −30° C., at least −20° C., at least −10° C. or at least 0° C. The temperature of the oxidant introduced into the heat transfer system may be at most 3000° C., at most 2000° C., at most 1200° C., or at most 1000° C. In some embodiments, the oxidant may be preheated prior to its introduction into the oxidant introduction zone end 40 of the heat transfer system 10.

The geometry of the oxidant introduction zone 40 and of the fuel introduction zone 26 are such as to provide for a velocity of the preheated oxidant and a fuel velocity into and through the combustion zone 30 such that the formation of a flame during the combustion of the combustion mixture is prevented. The combustion exhaust gases pass from the combustion zone 30 through the exhaust end 36, which provides means for the discharge of the combustion exhaust from the combustion zone 30.

The process tube 18 is positioned external to and surrounding the oxidant tube 16 so as to thereby define the process fluid zone 50 along at least a portion of the length of the oxidant introduction tube 16. The process tube 18 has a length that extends from process fluid inlet end 52 to process fluid outlet end 54. The process fluid inlet end 52 provides means for introducing a process fluid into the process fluid zone 50, and the process fluid outlet end 54 provides means for discharging from the process fluid zone 50 a heated process fluid.

It is an aspect of the inventive heat transfer system 10 for the process fluid zone 50 to be configured so that it is in heat exchange relationship with the combustion zone 30, or that the process fluid zone 50 is in heat exchange relationship with the oxidant introduction zone 40, which in turn is in heat exchange relationship with combustion zone 30. This heat exchange relationship provides for the transfer of heat energy into the process fluid zone 50 thereby heating the process fluid passing through the process fluid zone 50. Depicted by the curvy arrows 46 is the flow of heat energy from the combustion zone 30, or from the oxidant introduction zone 40, or from both the combustion zone 30 and oxidant introduction zone 40, to the process fluid passing through the process fluid zone 50.

Provided at the oxidant introduction tube outlet end 44 is a closure 56, which provides means for fluidly isolating the process fluid zone 50 from the oxidant introduction zone 40, combustion zone 30, and fuel introduction zone 26. As it is depicted in FIG. 1, the distal end 22 of fuel tube 12 extends to the closure 56 where it is fixedly attached thereto; however, this is an optional feature of the heat transfer system. The distal end 22 of fuel tube 12 may extend to and terminate at a point anywhere from within the combustion zone 30 defined by the reaction tube 14 to the closure 56. The reaction tube inlet end 34 terminates at a point distant from the closure 56 so as to provide for the fluid communication between the oxidant introduction tube outlet end 44 and reaction tube inlet end 34.

Figure 2:
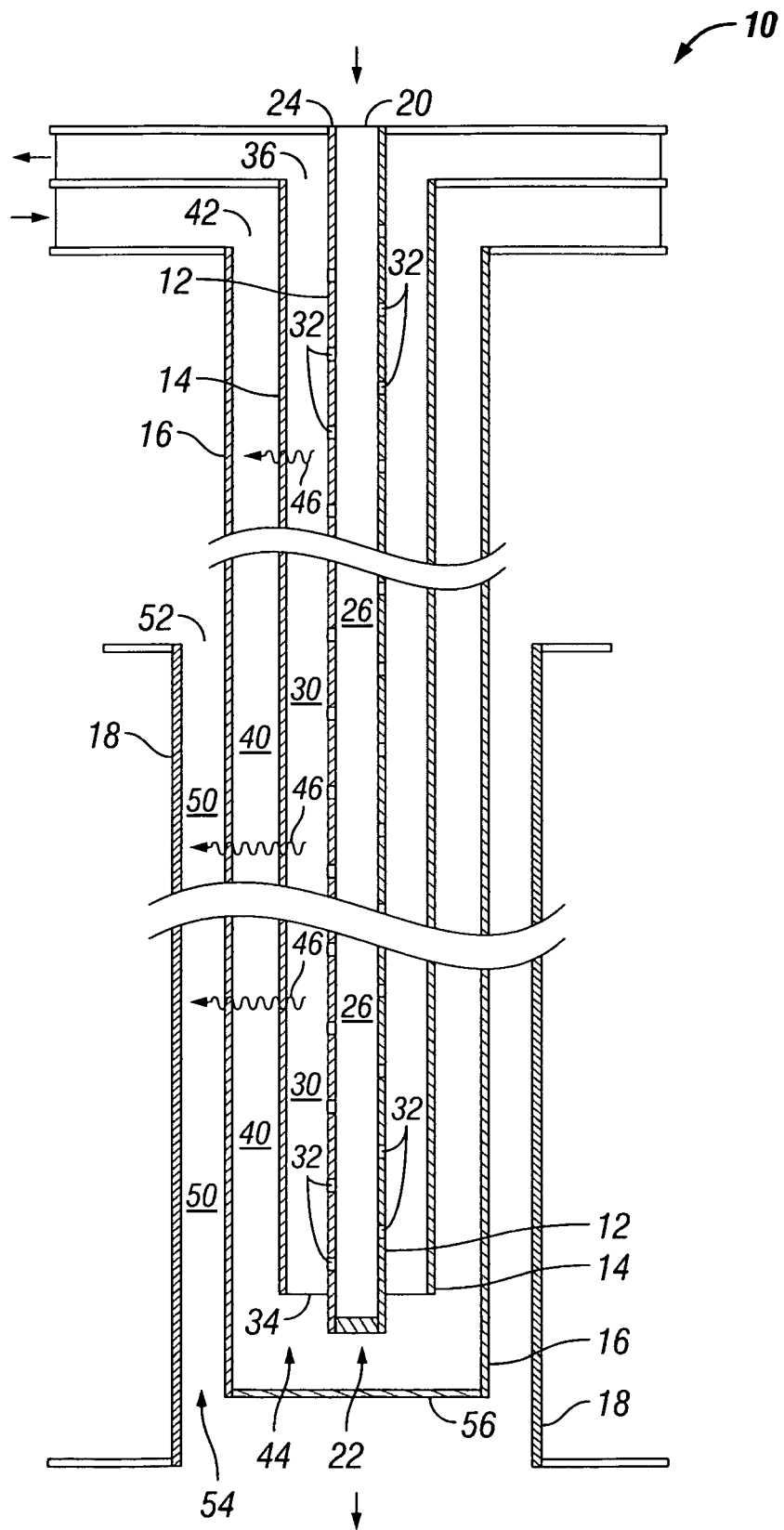
FIG. 2 is a sectional view of an embodiment of the heat transfer system for the combustion of a fuel and for the heating of a process fluid.

FIG. 2 depicts an embodiment of the heat transfer system 10 where the distal end 22 of fuel tube 12 does not extend to the closure 56. In FIG. 2, the distal end 22 of the fuel tube 12 extends to and terminates at a point within the oxidant introduction zone 40. A fuel tube that is not fixed to closure 56 will be able to expand and/or contract due to thermal expansion without resulting in detrimental mechanical effects on any of the other tubes. In addition, the oxidant introduction tube 16 will be able to expand and/or contract due to thermal expansion without resulting in detrimental mechanical effects on the fuel tube.

The heat transfer system 10 may be designed for use in any application that may exploit the benefits of direct heating of a process fluid through the use of a four-tube heating device as described in detail herein. One such application is in the heating of a process fluid of a dehydrogenation process in which the heated process fluid is contacted under dehydrogenation process conditions with a dehydrogenation catalyst to yield a dehydrogenation product. Other processes that may productively or suitably exploit the advantages of the heat transfer system may include steam reforming and olefins cracking.

A number of factors may impact the design of the heat transfer system 10; including, for example, the temperature of the oxidant that is introduced into the oxidant introduction zone 40, the temperature of the process fluid that is introduced into the process fluid zone 50, the desired temperature of the heated process fluid and the composition of the fuel that is introduced into the fuel introduction zone 26.

Any suitable fluid that is combustible in the presence of an oxidant, such as oxygen or air, may be used in the operation of the heat transfer system 10. Examples of such fuels include hydrogen and hydrocarbons. The hydrocarbons that may be used as a fuel include those hydrocarbons having from one to six carbon atoms, including, methane, ethane, ethylene, propane, propylene, propyne, butane, butylenes, and butyne. Preferred fuels include those selected from the group consisting of hydrogen, methane, ethane and mixtures thereof. Steam may be added to the fuel to prevent or inhibit formation of coke.

The process fluids to be heated by use of the heat transfer system 10 may be any process fluid to be heated for any purpose. However, the heat transfer system has particularly beneficial application when used in the heating of process fluids that are chemical reactant feedstock. And, especially, the heat transfer system of the invention has particular application in dehydrogenation processes such as ethylbenzene dehydrogenation processes for the manufacture of styrene. In such an application, the process fluid to be heated using the heat transfer system 10 comprises ethylbenzene. The process fluid may further comprise steam, and it may further comprise styrene and other typical components of a dehydrogenation reactor feedstock. For the dehydrogenation application, the process fluid introduced into the process fluid zone 50 through process fluid inlet end 52 typically has a temperature in the range of from 260° C. (500° F.) to 704° C. (1300° F.), more typically, from 315° C. (600° F.) to 677° C. (1250° F.), and, most typically, from 427° C. (800° F.) to 649° C. (1200° F.).

The typical temperature increase of the process fluid heated by use of the heat transfer system 10 may be in the range of from 10° C. to 500° C., but, more typically, the temperature increase is in the range of from 50° C. to 400° C., and most typically, from 100° C. to 350° C.

One example of the application of the heat transfer system 10 is in the use thereof to heat a dehydrogenation process feedstock comprising ethylbenzene. In such an application a plurality of individual units of the heat transfer system 10 may be bundled together to form a bundle. Each of the heat transfer system 10 units of the bundle may be designed to handle a feedstock flow rate in the range of from about 800 kg/hr (1800 lbs/hr) to about 1450 kg/hr (3200 lbs/hr) with the temperature of the introduced feedstock being in the range of from about 500° C. to about 600° C. and with the increase in the feedstock temperature provided by the heat transfer system 10 being in the range of from about 50° C. to about 150° C. For this design, the fuel tube 12 has a fuel tube length in the range of from about 4.5 m (15 ft) to about 12.2 m (40 ft). The apertures 32 are spaced apart by a distance in the range of from about 15 cm (0.5 ft) to about 61 cm (2 ft) along the entire length of the fuel tube 12 thus providing as few as 7 or 8 apertures to as many as 80 or more apertures along the length of the fuel tube. The apertures may also be oriented in each of the respective radial planes at the 0 degree, 120 degree and 240 degree orientations. The diameter of the apertures 32 may be in the range of from about 0.7 mm (0.03 inches) to about 5.1 mm (0.2 inches). Preferred fuels are those selected from the group consisting of hydrogen, methane, ethane, propane and mixtures thereof. The fuel is introduced through fuel inlet end 20 into the fuel introduction zone 26 at a fuel flow rate in the range of from about 0.14 m$^3$/min (5 scfm) to about 1.1 m$^3$/min (40 scfm). A preferred oxidant is air, which is introduced through oxidant introduction tube inlet end 42 into the oxidant introduction zone 40 at a flow rate in the range of from about 0.4 m$^3$/min (15 scfm) to about 4.2 m$^3$/min (150 scfm).

That which is claimed is:

1. A process system, comprising:
 a fuel tube having a fuel tube length and a fuel tube wall that define a fuel introduction zone, wherein said fuel tube includes a distal end and a fuel inlet end for introducing a fuel into said fuel introduction zone, and wherein along said fuel tube length and through said tube wall is a plurality of spaced apart apertures;

a reaction tube having a reaction tube length and that is positioned external to and surrounding said fuel tube so as to thereby define a combustion zone along said fuel tube length, wherein said reaction tube has a reaction tube inlet end for receiving a preheated oxidant into said combustion zone and an exhaust end for discharging a combustion exhaust from said combustion zone, and wherein said plurality of spaced apart apertures provide for fluid communication between said fuel introduction zone and said combustion zone;

an oxidant introduction tube having an oxidant introduction tube length and that is positioned external to and surrounding said reaction tube so as to thereby define an oxidant introduction zone along said reaction tube length, wherein said oxidant introduction tube has an oxidant introduction tube inlet end for introducing an oxidant into said oxidant introduction zone and an oxidant introduction tube outlet end for discharging said preheated oxidant from said oxidant introduction zone into said combustion zone through said oxidant introduction tube outlet end which is in fluid communication with said reaction tube inlet end, and wherein said oxidant introduction zone is in heat exchange relationship with said combustion zone; and a process tube that is positioned external to and surrounding said oxidant introduction tube so as to thereby define a process fluid zone along said oxidant introduction tube length of said oxidant introduction tube, wherein said process tube has a process fluid inlet end for introducing a process fluid into said process fluid zone and a process fluid outlet end for discharging a heated process fluid from said process fluid zone, and wherein said process fluid zone is in heat exchange relationship with said combustion zone.

2. A process system as recited in claim 1, wherein said apertures of said plurality of spaced apart apertures are spaced along said fuel tube length and are sized so as to provide for the introduction of increments of said fuel into said preheated oxidant within said combustion zone such that when said increments of said fuel are mixed with said preheated oxidant a combustion mixture is formed such that a combustion occurs that is not limited by the rate of mixing.

3. A process system as recited in claim 2, wherein the heat exchange relationship between said oxidant introduction zone and said combustion zone provides for the heating of said oxidant to yield said preheated oxidant.

4. A process system as recited in claim 3, wherein said heat exchange relationship between said process fluid zone and said combustion zone provides for the heating of said process fluid to yield said heated process fluid.

5. A process system as recited in claim 4, wherein the heat exchange relationship between said oxidant introduction zone and said combustion zone further provides for a preheated oxidant temperature of said preheated oxidant such that said combustion mixture has a combustion mixture temperature exceeding the auto-ignition temperature of said combustion mixture.

6. A process system as recited in claim 5, wherein said oxidant introduction zone is further characterized by an oxidant introduction zone geometry, wherein said fuel introduction zone is further characterized by a fuel introduction geometry, wherein said fuel introduction geometry and said oxidant introduction zone geometry are such as to provide for a fuel velocity and a preheated oxidant velocity that prevent the formation of a flame during said combustion.

7. A method, comprising:

introducing a fuel into a fuel tube having a fuel tube length and a fuel tube wall that define a fuel introduction zone, wherein said fuel tube includes a distal end and a fuel inlet end for introducing said fuel into said fuel introduction zone, and wherein along said length and through said tube wall is a plurality of spaced apart apertures;

introducing a preheated oxidant into a reaction tube having a reaction tube length and that is positioned external to and surrounding said fuel tube so as to thereby define a combustion zone along said fuel tube length, wherein said reaction tube has a reaction tube inlet end for receiving said preheated oxidant into said combustion zone and an exhaust end for discharging a combustion exhaust from said combustion zone, and wherein said plurality of spaced apart apertures provide for fluid communication between said fuel introduction zone and said combustion zone;

introducing an oxidant into an oxidant introduction tube having an oxidant introduction tube length and that is positioned external to and surrounding said reaction tube so as to thereby define an oxidant introduction zone along said reaction tube length, wherein said oxidant introduction tube has an oxidant introduction tube inlet end for introducing said oxidant into said oxidant introduction zone and an oxidant introduction tube outlet end for discharging said preheated oxidant from said oxidant introduction zone into said combustion zone through said oxidant introduction tube outlet end which is in fluid communication with said reaction tube inlet end, and wherein said oxidant introduction zone is in heat exchange relationship with said combustion zone;

introducing a process fluid into a process tube that is positioned external to and surrounding said oxidant introduction tube so as to thereby define a process fluid zone along said oxidant introduction tube, wherein said process tube has a process fluid inlet end for introducing said process fluid into said process fluid zone and a process fluid outlet end for discharging a heated process fluid from said process fluid zone, and wherein said process fluid zone is in heat exchange relationship with said combustion zone;

discharging said heated process fluid from said process fluid zone; and discharging said combustion exhaust from said combustion zone.

* * * * *